2 Sheets—Sheet 1.

C. O. MASON.
Corn and Seed Dropper.

No. 214,939. Patented April 29, 1879.

WITNESSES
Robert Everett
N Clay Smith

INVENTOR
Cyrus O. Mason.
By Gilmore Smith & Co.
ATTORNEYS.

2 Sheets—Sheet 2.

C. O. MASON.
Corn and Seed Dropper.

No. 214,939. Patented April 29, 1879.

WITNESSES

INVENTOR
Cyrus O. Mason.
By Gilmore Smith & Co.
ATTORNEYS

UNITED STATES PATENT OFFICE.

CYRUS O. MASON, OF UNION, NEW YORK.

IMPROVEMENT IN CORN AND SEED DROPPERS.

Specification forming part of Letters Patent No. 214,939, dated April 29, 1879; application filed February 15, 1879.

*To all whom it may concern:*

Be it known that I, CYRUS O. MASON, of Union, in the county of Broome and State of New York, have invented certain new and useful Improvements in a Corn and Seed Dropper; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1:
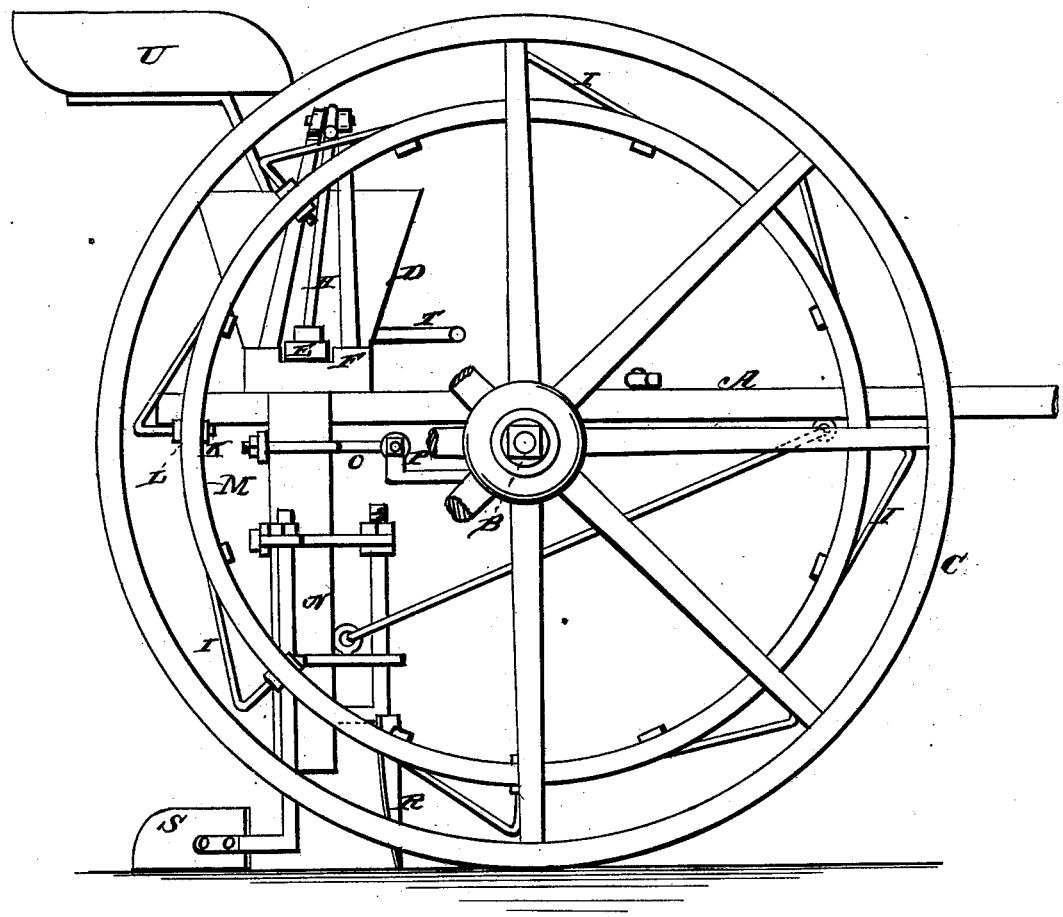
Figure 2:
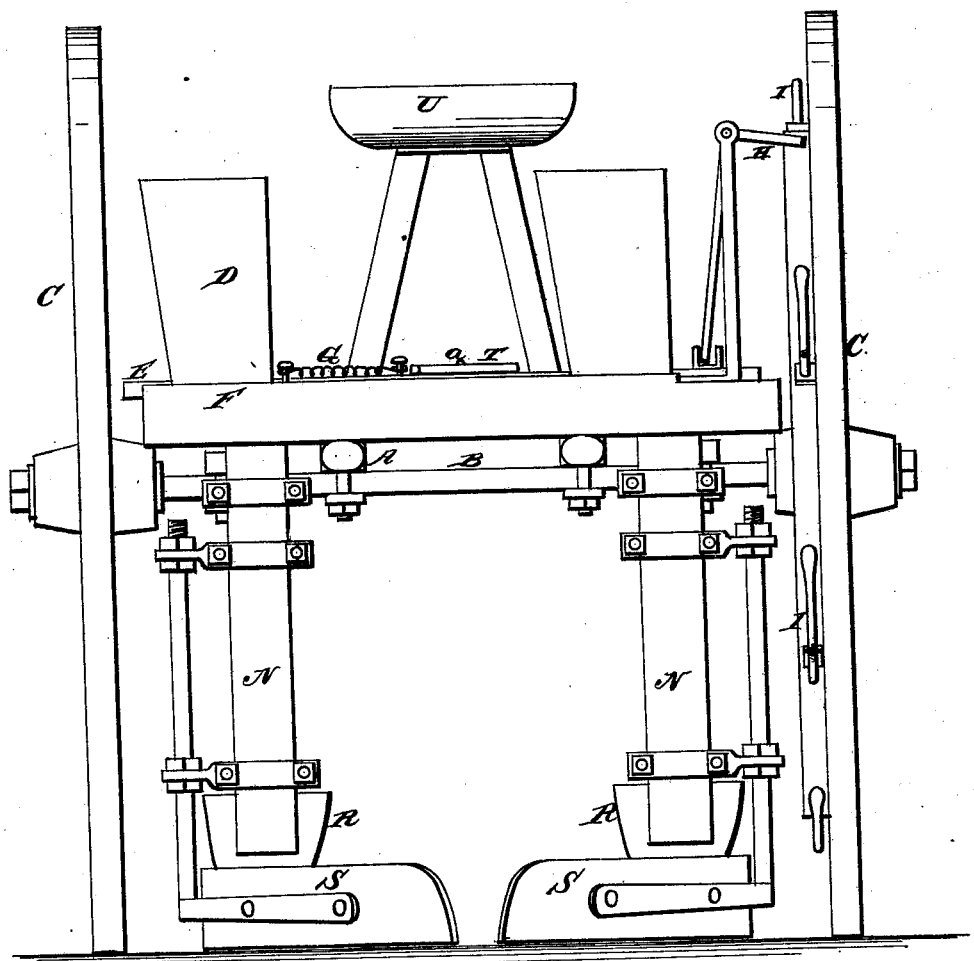

Figure 1 is a side elevation, and Fig. 2 a rear view.

This invention relates to certain improvements in seed and corn planters; and it has for its object to provide a means by which the seed or corn can be dropped automatically from suitable hoppers at any desirable predetermined distance apart in the rows, and, further, to provide for increasing the distance between the rows at will, as may be desired; and it consists in the improved construction hereinafter fully described, and particularly pointed out in the claim.

The letter A represents the truck or frame of my apparatus; B, the axle thereof, and C the wheels on which said frame is mounted. D represents two hoppers mounted upon the frame directly above a transversely-reciprocating feed-bar, E, which is adapted to move in guides or ways F in the frame or truck. The letter G represents a retractile spring secured at one end to the frame A and at the other to the feed-bar, the office of said spring being to retain and return the feed-bar to a normal position after being shifted by the cams on the driving-wheel. The letter H represents an angular lever, one end of which connects with the reciprocating feed-bar, and the other of which is located in the track of a series of angular cams, I, which are detachably secured to one of the wheels C. These cams are adapted to be secured by means of screw-nuts K in apertures L, formed at intervals upon a circular support, M, attached to the wheel in such manner that, by varying the number of said cams and their relative positions with respect to each other, the feed-bar may be operated any given number of times as the apparatus travels over a given distance, and thus regulate the distances between the corn or seed dropped, as may be desired.

The feed-bar is provided with apertures, which are located so as to fall into and out of line with apertures in the bottom of the hopper, so as to deliver the seed or corn to the drop-tubes at each reciprocation of the feed-bar in the usual manner.

The letter N represents the drop-tubes, which are secured to the frame or truck by swivel-joints O P, so that they can be adjusted either vertically or laterally in order to adjust said tubes to deliver the seed to the desired depth in the ground, to provide for elevating said tubes when the apparatus is not in use for planting, and to enable the width between the rows to be varied.

The dropping-tubes are provided with markers R in front, which mark the earth where the seeds or corn are to be dropped, and with covering-shovels S at the rear for covering the seed after being dropped. These markers and shovels being rigidly attached to the tubes move with them, so as to act in proper relation thereto without separate adjustment.

The letter T represents a lever fulcrumed to the frame A at *a*, and bearing against a lug on the feed-bar. Said lever is so located that its free end will be within convenient reach of the driver seated on the seat U of the truck or frame, so that said driver may throw the said feed-bar out of gear and stop the delivery of seed when the apparatus is being turned, or whenever otherwise desired.

I am aware that seed-slides have been operated by cams secured to the driving-wheel of a corn or seed planter, and that adjustable hoppers and seed-tubes carrying covers, &c., are not new in themselves. I do not, therefore, claim either of these constructions broadly; but

I claim—

In combination with the hoppers and the reciprocating feed-bar, the dropping-tubes attached to the frame or truck by swivel-joints, whereby said tubes with the markers and coverers may be adjusted laterally and vertically, and the angle-lever pivoted in a standard in the frame, the lower end of said lever being connected with the feed-bar, and its upper end located in the track of a series of detachable cams secured to one of the driving-wheels, substantially as and for the purposes set forth.

In testimony that I claim the foregoing as my own I affix my signature in presence of two witnesses.

CYRUS O. MASON.

Witnesses:
S. HAGADORN,
DARWIN DAY.